April 11, 1939. T. TEETERS 2,154,414
FURNACE CONSTRUCTION
Filed March 5, 1938
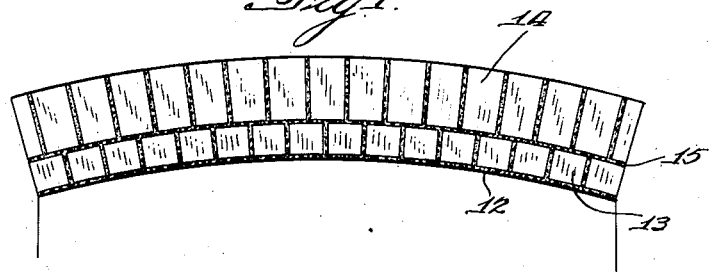
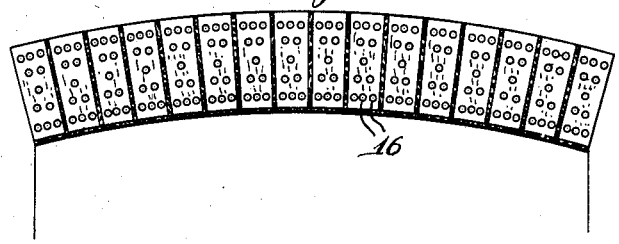
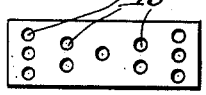  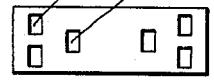
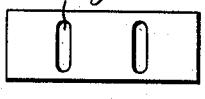 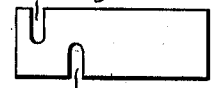 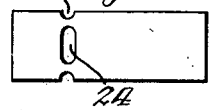
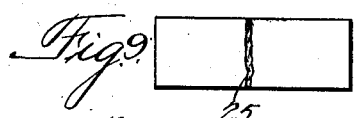
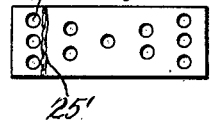
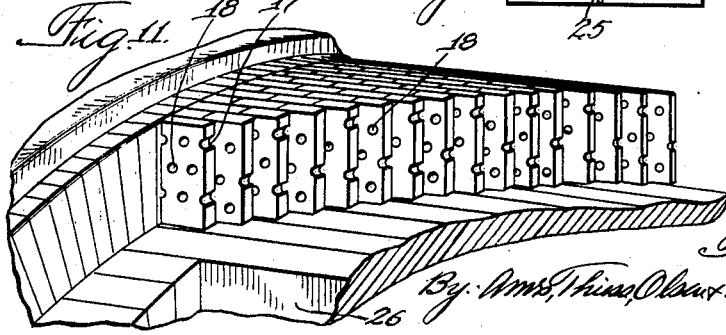
Inventor
Thomas Teeters
By Anns, Thing, Olson & Mecklenburger
Attys Patented Apr. 11, 1939

2,154,414

UNITED STATES PATENT OFFICE 2,154,414

FURNACE CONSTRUCTION

Thomas Teeters, Snyder, N. Y.

Application March 5, 1938, Serial No. 194,110

5 Claims. (Cl. 263—46)

The present invention relates to improvements in furnace construction, having particular reference to the type of refractory used therein.

One of the objects of the invention is to provide a furnace construction in which refractories are used which are provided with means for limiting the penetration thereinto of destructive fluxing materials which ordinarily cause the breakdown of the brick or lining material, thus shortening the life of the furnace in which they are used.

A further object of the invention is to provide a refractory, as for example a silica brick, suitable for use in the side walls, and particularly the arches and roof, of an open-hearth steel furnace in which the brick are provided with means that prevent premature failure of the roof and arches by preventing the brick from breaking in half.

A further object of the invention is to provide a silica brick which has internal barriers that prevent the progressive advance through the brick of a characteristic "zone of weakness" that would soon lead to the breaking of the brick if its continued advance were not checked.

Still a further object of the invention is to provide a furnace roof construction so laid that the the penetration of the fluxing material through the brick will be distinctly limited so as to prevent penetration through the entire brick or at least to an extent sufficient to prevent the brick from falling from their position in the roof of the furnace.

Other objects will become evident from the further description and claims hereinbelow.

For a better understanding of the invention, a drawing has been provided in which Figure 1 is a diagrammatic representation of a furnace roof showing one type of construction, this being considered as a section through a furnace taken at a point so that the flat sides of all of the brick would be exposed; Fig. 2 is a view similar to Fig. 1, showing a particular type of brick employed for a construction otherwise like that of Fig. 1; Figs. 3 through 8 show various modifications of the brick in Fig. 2; Fig. 9 shows a brick such as those used in the prior art, showing a zone of weakness therein; Fig. 10 shows a brick constructed in accordance with the teachings of the present invention, in which the zone of weakness is in a different position by reason of the construction of the brick; and Fig. 11 is a perspective view of a furnace roof during its process of erection, so as to show the method of setting the brick, and their relative position; all as will be more fully hereinafter described.

In its broadest aspects the invention aims at the overcoming of a very serious difficulty which has always existed in connection with furnaces, particularly metallurgical and open-hearth steel furnaces. It has long been known that the arches and roofs of such furnaces, which are usually made of a silica brick, rapidly deteriorate in use by the interpenetration thereinto of flux and slag, which are carried to the brick in gaseous or suspended form from the bath in the furnace. Silica brick when freshly made contain substantially 98% of silica in the form of ganister, the silica of which has been at least partially transformed into other modifications of silica. The brick also contain about 2% of a bonding agent, such as lime. This brick has usually been burned by the manufacturer at a temperature corresponding to about cone 19, which is about 2768° F. The temperature at which the furnace is used, however, is very close to the firing temperature of the brick and sometimes even slightly exceeds it, but will not melt the product in its ordinary condition. In use, iron oxides and other materials become attached to the hot end of the brick and slowly penetrate into the brick because of its porosity, which is usually on the order of about 25% to 30%. The compounds immediately formed, and the transformation in the type of silica, are not ordinarily considered deleterious; but it has been noticed quite widely that, for some reason not fully explained, there develops in the brick a relatively narrow band or zone of weakness. This zone is characterized by a salmon pink or pinkish color which is quite easily recognized if the used brick, after removal from the furnace, is sawed through lengthwise to expose its interior. This zone of weakness is such that it would tend to cause breakage of the brick if sufficient force were applied to it. The main force, of course, which acts upon the brick is the force of gravity, so that if this zone of weakness extends only a short distance into the brick no particular harm results. However, in the continued use of the brick, this zone of weakness gradually creeps up, away from the heat, towards the cold end of the brick; and when it has reached a point about one-third of the way up the brick, or beyond, there will be sufficient weight below the zone of weakness to cause fracture of the brick in the zone of weakness, as a result of which the brick falls, with destructive effect upon the roof of the furnace, which is usually made in the form of an arch, the strength of which depends upon the coaction of the individual brick, each one tending to hold up the two next to it.

The phenomenon of the zone of extending weakness has already been very fully investigated in a scientific manner and is particularly well described in an article by Fred A. Harvey in the Journal of the American Ceramics Society, March, 1935, vol 18, No. 3, pages 86–94. In the said article there is a Fig. 2 opposite page 87, which very clearly shows this line of weakness, this being a colored illustration in which the zone of weakness is to be found approximately halfway up the brick, while the lower end, into which the iron oxide and other fluxing agents have heavily penetrated, is shown in a darker color. The melting point of the product is not very greatly affected by the penetration of these fluxing materials, but the zone of weakness has a peculiar structure which renders the brick very apt to break at that point. There is an additional phenomenon which causes such breakage to be quite serious, and that is the fact that the melting point of the material in the relatively narrow zone of weakness is much lower than the melting point or softening point of the rest of the brick, either toward its hot end or its cold end, so that, if a break occurs and a brick falls, the material in the zone of weakness tends to melt and starts to drop down into the furnace, forming stalactites. When a furnace roof has reached that stage it is no longer possible to operate the furnace, and it therefore becomes necessary to shut it down and to replace the roof. This of course is time consuming and expensive, keeping the furnace inactive until the roof has been replaced. Many attempts have been made to overcome this difficulty. According to the aforementioned article, one way of trying to solve the problem was to insulate the roof so as to prevent heat losses from the cold end of the brick, with the idea of causing the zone of weakness so rapidly to traverse the brick as to quickly place it as near the cold end as possible, where the brick is naturally too cool for the zone of weakness to cause any difficulty. While this partly solves the problem, it leads to another great difficulty, which is that, because of the limited escape of heat, the brick soon becomes overheated and tends to fuse, and therefore the roof fails anyway.

The problem was also investigated more recently by R. H. H. Pierce, Jr., and J. B. Austin, as described in the Journal of the American Ceramics Society, October, 1936, vol. 19, No. 10, pages 276–287. Here again the zone of weakness is emphasized and the penetration of iron oxide discussed.

The present inventor has addressed himself to a solution of this problem by means which on their face appear to be not only simple but paradoxical. Realizing that insulation of the brick merely aggravated the problem by causing the zone of weakness to progress entirely through the brick so that it would gradually move from one end to the other, the present inventor has found that he can prevent the migration of this zone of weakness in such a way as to keep it so near the hot end of the brick that failures will not occur, because there will be insufficient weight below the zone of weakness to cause breakage. He can accomplish this in two different ways. For example, in accordance with the construction shown in Fig. 1, he can deliberately break his brick or, what amounts to the same thing, use two brick instead of one, therefore deliberately producing a break in the continuity of the furnace roof; for he has discovered that, for some unexplained reason, the zone of weakness will not jump a gap, even though it be a comparatively small one.

It appears to be fairly certain, from all of the investigations made by the inventor and the others hereinabove mentioned, that the zone of weakness is produced by the gradual filtration into the brick of the fluxing material, which gradually causes changes in the physical nature of the silica and in the bonding agent of the brick. Near the hot end of the brick the iron oxide introduced possibly combines with some of the silica, forming iron silicates, which however are at least as refractory as the brick itself and which therefore do no real harm. For that reason it is quite likely that the insulation of the brick as suggested in the articles hereinabove mentioned somewhat alleviates the difficulty. The present inventor however finds that he gets far superior results, at much less expense, by limiting the progression of the zone of weakness by interposing into its path some means which prevents its further progress.

In accordance with Fig. 1, he may, for example, form the roof of the furnace 12 of one layer of brick 13 backed by another layer of brick 14, leaving a space 15 between the brick. This space should not consist of setting cements or mortars, which should be used only in the vertical spaces between the brick. It will be found that when constructing a furnace in accordance with Fig. 1, the zone of weakness will fairly rapidly traverse the lower brick 13 and its progress will end at the far end of the lower brick 13. It will not jump the gap between brick 13 and 14. It is particularly pointed out that brick 13 and 14 are of identical composition and that no attempt at all is made to insulate the furnace roof. There is however one disadvantage in the construction shown in Fig. 1, and that lies in the difficulty in erecting it. It is quite hard for an ordinarily skilled workman to construct an arch consisting of two such layers, and the average furnace builder greatly prefers to use single brick. The inventor has therefore devised a way of interposing a hindrance to the forward march of the zone of weakness by the expedient of producing open spaces in the brick, preferably so oriented as virtually to produce open spaces across which the zone of weakness cannot advance. At first blush it may appear that this would greatly weaken the brick, and from a structural point of view it undoubtedly does;

but, strange as it may seem, a furnace constructed of such perforated brick lasts much longer than one made of solid brick. Attention is particularly directed to the fact that these brick, when placed as shown in Figs. 2 and 11, do not produce continuous passages that may be used for ventilation or cooling, as that is not at all the object of the present invention. In fact, when laying the brick, they are so staggered that the holes of any two adjacent brick are out of register with each other, as no attempt is made to cause continuous openings. In order better to illustrate this, Fig. 11 shows a roof of a furnace in progress of erection, which gives an idea of how the brick can be used. It will be seen from Fig. 11 that the brick are staggered so that the holes do not come into register with each other, some of the brick shown being of the type specifically illustrated in Fig. 4.

Referring now to Figs. 3 through 8, it will be seen that what the inventor has done is to provide brick with a series of openings or voids at the hot end thereof. Openings are also shown at the cold end but of course have no function there, the reason for making the brick as shown, for example in Figs. 3, 4, 5 and 6, being simply a matter of expediency, so that when laying the brick the mason does not have to examine each one to see whether or not it is properly oriented. Obviously the openings will do no harm in the cold end of the brick, while they do perform a most useful function at the hot end. A very advantageous way of making the brick is, for example, that shown in Fig. 3, in which there are several rows of openings 16, first three, then two (the latter being staggered relative to the first two), and then one, while in Fig. 4 there are indentations 17 at the side of the brick and one opening 16 in the middle of the end of the brick, there being two holes or openings 18 in the center of the brick. In Fig. 5 openings 19 and 20 of rectangular form are shown, while in Fig. 6 a slot or rather wide opening 21 is shown. In Fig. 7 there are merely two rather deep indentations 22 and 23. In Fig. 8 there are shallow indentations 17 and a rather extended transverse slot 24. The orientation of the openings is of course repeated on the other side of the brick, although this is not shown in Figs. 7 and 8. In Fig. 9 there is shown diagrammatically a cross section of an unperforated brick, showing at 25 the zone of weakness. In Fig. 10 the zone of weakness is indicated in a similar manner at 25', but it will be seen that there it is only in the space directly contiguous to the first set of openings 16. It would seem that the zone of weakness would continue to extend at those points of the brick where there are no openings, but actual commercial tests have completely demonstrated that this does not happen. Why this is so is difficult to explain, but it nevertheless remains as an empirical fact.

The great advantages resulting from this invention will at once be evident because it will not be necessary for a furnace builder to change his mode of construction in any way whatsoever. All he has to do is to substitute the brick provided with openings for the ordinary solid brick which he has hitherto used and build the furnace, for example, in the manner illustrated diagrammatically in Fig. 2 and practically in Fig. 11. It may be mentioned in passing that Fig. 11 was drawn from a photograph showing an actual furnace roof during its erection. The wooden form 26 is shown temporarily supporting the arch of brick. Fig. 2 therefore is to be taken as purely diagrammatic for the purpose of illustrating the thought behind the invention and is not to be construed as a working drawing or an illustration of an actual furnace roof.

The inventor is of course aware of the fact that perforated ceramic materials have been used in the past and that many hollow brick and hollow tile have been used in the erection of houses and other buildings. In such cases however the empty spaces in the brick have been placed therein purely and solely for the purpose of effecting a saving in material and in weight. The prior art shows brick provided with holes which may have an orientation that superficially resembles the brick of the present invention, but there is no indication anywhere in the entire furnace construction or ceramic art of the solution of the problem which the present inventor has so successfully solved. By means apparently paradoxical and simple he has overcome a difficulty which, though investigated by men of high scientific standing, has defied solution until solved by the present inventor. It would appear—and this is presented merely as a suggestion and is not intended to bind this inventor—that the penetration of the fluxing materials can take place only in a direction along the lines of heat-flow, and that therefore the zone of weakness in an ordinary unperforated brick will naturally advance along a more or less well defined front. In the case of the present invention however, this front is broken up by the openings, causing a sort of refraction, as one might say, which diverts the progress of the zone of weakness so that it can no longer advance as a unit, and therefore it does not advance at all.

Samples of brick constructed in accordance with the teachings of the present invention were used and then removed from a furnace roof and sawed lengthwise. It was found that the zone of weakness had not advanced much beyond the first row of holes or openings, while in similarly treated unperforated brick the zone of weakness was well developed and had progressed about half way toward the cold end of the brick. In other words, by practical tests the workability and operativeness of this invention has been proved beyond peradventure. It will of course be obvious that these holes need not necessarily pass all the way through the brick, and if a way could be devised of making spherical closed voids in the brick, these would act in the same manner. As a manufacturing proposition however, the production of such completely closed rather large voids would be virtually impossible or at least difficult and expensive, and for this reason the brick are molded with holes which extend from one side of the brick to the other, and which are preferably slightly tapered to allow the necessary draft to remove the brick from the molds.

In order to complete the inventor's disclosure so that the manufacture of these brick may be taken up by anyone desirous of making them upon the expiration of this patent, it might be stated that they can be successfully made by mixing 98% of ganister of the type known as Medina ganister with 2% of calcium hydrate, these materials being mixed with 11% to 14% of water in the following manner: A ganister ground to a screen analysis as shown in the table hereinbelow is mixed while dry with 2% of calcium hydrate, and sufficient water is then added so that from 11% to 14% of moisture will be present in the mass. It is ground in a wet pan for a period of from 9 to 12 minutes and is then hammer-molded in the usual manner known in this art. It is then dried and fired for a period of 9 to 10 days to cone 19, or about 2768° F. After cooling, the brick are ready for use.

Table

| Openings | | Mesh | Diameter wire inches | Retained on— | | Percent cumulative weights | 2nd accumulation divided by 100 | Percent through |
|---|---|---|---|---|---|---|---|---|
| Inches | Millimeters | | | Sample weights | Percent | | | |
| .263 | 6.680 | 3 | .070 | -------- | -------- | -------- | -------- | -------- |
| .185 | 4.699 | 4 | .065 | -------- | -------- | -------- | -------- | 100.0 |
| .131 | 3.327 | 6 | .036 | 2.1 | 2.1 | -------- | -------- | 97.9 |
| .093 | 2.362 | 8 | .032 | 7.2 | 7.2 | 9.3 | .093 | 90.7 |
| .065 | 1.651 | 10 | .035 | 9.0 | 9.0 | 18.3 | .276 | 81.7 |
| .046 | 1.168 | 14 | .025 | 6.6 | 6.6 | 24.9 | .525 | 75.1 |
| .0328 | .833 | 20 | .0172 | 4.5 | 4.5 | 29.4 | .819 | 70.6 |
| .0232 | .589 | 28 | .0125 | 4.3 | 4.3 | 33.7 | 1.156 | 66.3 |
| .0164 | .417 | 35 | .0122 | 5.7 | 5.7 | 39.4 | 1.550 | 60.6 |
| .0116 | .295 | 48 | .0092 | 7.9 | 7.9 | 47.3 | 2.023 | 52.7 |
| .0082 | .208 | 65 | .0072 | 10.2 | 10.2 | 57.5 | 2.598 | 42.5 |
| .0058 | .147 | 100 | .0042 | 9.8 | 9.8 | 67.3 | 3.271 | 32.7 |
| .0041 | .104 | 150 | .0026 | 6.6 | 6.6 | 73.9 | 4.010 | 26.1 |
| .0029 | .074 | 200 | .0021 | 3.7 | 3.7 | 77.6 | 4.786 | 22.4 |
| -------- | -------- | Pan | -------- | 22.4 | 22.4 | -------- | -------- | -------- |
| | | Totals | | 100.0 | 100.0 | | | |

It will thus be seen that there is nothing new so far as the composition of the brick is concerned, and that the novelty lies in the application of the principle found by the inventor, to wit, that the forward progress of the zone of weakness can be arrested by interposing, in the path thereof, openings or other barriers which prevent its further advance. It has been found that it is not necessary that the openings actually be empty or devoid of substance. For example, they could very well be filled with a refractory of a somewhat different nature than the rest of the brick, or even with metallic inserts. Obviously, however, such a construction would be more expensive, but it is mentioned here as an equivalent to the inventor's construction; and such construction is to be considered as within the scope of the inventor's teachings and to be encompassed by the hereunto appended claims.

Attention is particularly directed to the fact that the size and orientation of the holes are not very important, but obviously they should not be microscopic in size and ordinarily, for a brick such as is used in this art, should have an interior diameter of, say, about one inch. The invention therefore is to be contrasted with merely porous or cellular brick, and the openings are to be considered as on the order of, say, from one-half inch and upward; and the inventor lays no claim to the manufacture merely of porous or cellular brick or the use thereof in furnace construction. The invention rather comprises the use of refractory materials provided with means for preventing the progress therethrough of the characteristic zone of weakness hereinabove discussed.

What the inventor claims is:

1. In a furnace, the improvements which comprise a lining for those parts thereof out of direct contact with the charge therein comprising refractory bricks provided with internal noncommunicating openings near that end of the bricks presented to the interior of the furnace.

2. In a furnace, the improvements which comprise a lining for the arches and roof thereof made up of silica bricks provided with internal noncommunicating openings near that end thereof presented to the interior of the furnace.

3. A furnace roof made up of individual silica bricks provided with internal openings near the ends thereof directed toward the inside of the furnace, said openings being inaccessible from either end of the bricks.

4. A refractory brick suitable for lining furnaces and consisting of a refractory material subject to the development of and progressive inward movement of a zone of weakness therein by the infiltration of fluxing materials, protected against the advance of said zone of weakness by internal barriers to said advance, said barriers consisting of noncommunicating passageways in the brick so oriented as to lie athwart the line of advance of said zone of weakness.

5. A refractory brick suitable for lining furnaces and consisting of a refractory material subject to the development of and progressive inward movement of a zone of weakness therein by the infiltration of fluxing materials, protected against the advance of said zone of weakness by internal barriers to said advance, said barriers consisting of a multiplicity of mutually staggered noncommunicating passageways in the brick so oriented as to lie athwart the line of advance of said zone of weakness.

THOMAS TEETERS.